United States Patent
Zidan et al.

(10) Patent No.: US 10,138,122 B2
(45) Date of Patent: Nov. 27, 2018

(54) MECHANOCHEMICAL SOLID/LIQUID REACTION IN FORMATION OF ALANE

(71) Applicant: Savannah River Nuclear Solutions, LLC, Aiken, SC (US)

(72) Inventors: Ragaiy Zidan, Aiken, SC (US); Patrick A. Ward, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 15/482,913

(22) Filed: Apr. 10, 2017

(65) Prior Publication Data

US 2018/0290888 A1 Oct. 11, 2018

(51) Int. Cl.
*C01B 6/06* (2006.01)
*B01J 19/28* (2006.01)

(52) U.S. Cl.
CPC .............. *C01B 6/06* (2013.01); *B01J 19/28* (2013.01)

(58) Field of Classification Search
CPC ......... Y02E 60/362; C01B 6/06; C01B 3/065; B01J 19/28
See application file for complete search history.

(56) References Cited

U.S. PATENT DOCUMENTS

| | | | |
|---|---|---|---|
| 2,913,306 A | 11/1959 | Schechter | |
| 3,092,648 A | 6/1963 | Koster et al. | |
| 3,383,186 A | 5/1968 | Chini et al. | |
| 3,387,947 A | 6/1968 | Brendel | |
| 3,812,244 A * | 5/1974 | Schmidt | C01B 6/006 423/645 |
| 4,604,271 A | 8/1986 | Wagner et al. | |
| 4,748,260 A * | 5/1988 | Marlett | C07F 5/069 556/170 |
| 9,550,672 B2 | 1/2017 | Fisher | |
| 2005/0226801 A1 | 10/2005 | Chin | |
| 2007/0297964 A1 | 12/2007 | Soloveichik et al. | |
| 2009/0142258 A1 | 6/2009 | Ritter et al. | |
| 2009/0209409 A1 | 8/2009 | Soloveichik et al. | |
| 2009/0214409 A1 | 8/2009 | Chin et al. | |
| 2011/0236287 A1 | 9/2011 | Allen et al. | |
| 2012/0141363 A1* | 6/2012 | Zidan | C01B 3/065 423/645 |

(Continued)

FOREIGN PATENT DOCUMENTS

| | | |
|---|---|---|
| WO | WO 1996/015279 | 5/1996 |
| WO | WO 2015/123438 | 8/2015 |

OTHER PUBLICATIONS

Dynamic Article Links /Tony Szuppa, et al. Chem Soc Rev / Ball Milling in Organic Synthesis: Solutions and Challenges Dated Nov. 29, 2011 (13 pages).

(Continued)

*Primary Examiner* — Amber R Orlando
*Assistant Examiner* — Syed T Iqbal
(74) *Attorney, Agent, or Firm* — Dority & Manning, P.A.

(57) ABSTRACT

Methods for forming alane are described. The method drives the alane producing chemical reaction by a mechanical energy source such as a ball mill and includes stabilization of the product with solvent. At least one of the reactants is insoluble in the solvent. Thus, the product is both stabilized and phase-separated from the reactant(s) immediately upon formation. The method can be used to form α-alane, for instance for use in hydrogen storage.

13 Claims, 2 Drawing Sheets

(56) References Cited

U.S. PATENT DOCUMENTS

2014/0161703 A1    6/2014    Elowe et al.

OTHER PUBLICATIONS

The Royal Society of Chemistry /Green Chemistry / Premanand Ramrao Patil, et al. Solvent-Free Synthesis of Thioglycosides by Ball Milling Dated Mar. 4, 2009 (4 pages).
The Journal of Organic Chemistry / Nirmalya Mikherjee, et al. Reaction Under Ball-Milling Solvent-, Ligand- and Metal-Free Synthesis of Unsymmetrical Diaryl Dated 2013 (5 pages).

* cited by examiner

MECHANOCHEMICAL SOLID/LIQUID REACTION IN FORMATION OF ALANE

STATEMENT REGARDING FEDERALLY SPONSORED RESEARCH OR DEVELOPMENT

This invention was made with government support under Contract No. DE-AC09-08SR22470 awarded by the U.S. Department of Energy. The government has certain rights in the invention. This application and technology are controlled pursuant to ITAR Category V(c)(1) and (i).

BACKGROUND

Aluminum hydride, $AlH_3$, (also referred to as alane) has long been known as a useful reducing agent in organic synthesis. With the advent of alternative energy technologies, alane has also shown great promise as a hydrogen storage material. Alane forms numerous polymorphs, the most thermally stable of which and the form most sought for hydrogen storage is α-alane, which has a cubic or rhombohedral crystalline morphology.

Hydrogen as an energy carrier can be implemented in a variety of devices operated by fuel cells, offering high energy density for portable power systems. A major drawback in its utilization has been the lack of acceptable hydrogen storage mediums. Conventionally, hydrogen has been stored in the gas phase under high pressure or in the liquid phase at extremely low temperatures. Unfortunately, such storage mechanisms require expensive processing and facilities (e.g., high pressure containers and low temperature maintenance). Alane, with a gravimetric capacity of approximately 10 wt. % hydrogen and a volumetric capacity of about 1.48 $g/cm^3$, as well as an ability to release substantially all stored hydrogen effectively on demand, could be quite useful for solid phase storage of hydrogen for use as a fuel (for instance in a fuel cell application) and in solid energy applications (for instance as a propellant).

Unfortunately, alane remains untapped as a hydrogen storage material as the formation methods developed to date are economically unfeasible in the desired applications. The primary method currently used for synthesizing alane involves reacting aluminum chloride ($AlCl_3$) and lithium aluminum hydride (LAIN in solution, generally utilizing diethyl ether as solvent. The alanate reactant of the process, $LiAlH_4$, is very expensive, but use of lithium alanate as reagent has been necessary due to its solubility, which is necessary for the solution-based reaction to proceed.

Low yield has been another issue preventing economical adoption of alane for hydrogen storage applications. Alane monomer is thermodynamically unstable and as a result, in order to obtain significant alane product at all, it must be formed at high pressure or stabilized immediately upon formation. By use of a suitable electron donating solvent in the current processes (e.g., diethyl ether or tetrahydrofuran), alane adduct can form and stabilize the nascent monomeric product. However, this approach still leaves the problem of isolating the alane from other materials contained in the reaction mixture including impurities, excess reactants, and in some cases, the adduct complex partner itself, under conditions that polymerize the product in sufficient yield. For instance, the separation of alane from the ether adduct in the traditional lithium alanate process can lead to significant decomposition of the alane. Economically viable solutions to such problems remain elusive.

What is needed in the art is an economical method for formation of alane. For instance, a method that can utilize low cost reactants and that can provide a route for facile separation of the alane product (e.g., α-alane) from reactants and impurities would be of great benefit.

SUMMARY

According to one embodiment, disclosed is a mechanochemical production method for alane. More specifically, a method can include combining a solid phase reactant comprising an alkali metal, e.g., an alkali metal alanate, an alkali metal hydride, or an alkali metal, with an aluminum halide in the presence of a liquid phase Lewis base. More specifically, the solid phase reactant is not soluble in the Lewis base. In one embodiment, the Lewis base is not a particularly strong base. For instance, the conjugate acid of the Lewis base can have a $pK_a$ of about 2.5 or greater.

The method can also include repeatedly transferring mechanical energy to the reactants (e.g., via a ball mill, a planetary mill, a grinder, etc.) and thereby encouraging a mechanochemical reaction between the solid phase alkali metal-containing reactant and the aluminum halide to form alane. Upon formation, the alane can be stabilized by forming an adduct with the Lewis base and as such can be protected from decomposition and encourage higher yield. Moreover, as the solid phase reactant remains solid throughout the formation, the alane product is easily separated following formation.

In some embodiments, the method can also include isolating the alane from the Lewis base to obtain α-alane. Beneficially, in those embodiments in which the Lewis base used is not a particularly strong base, isolation of the alane from the complex can be relatively simple and economical.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
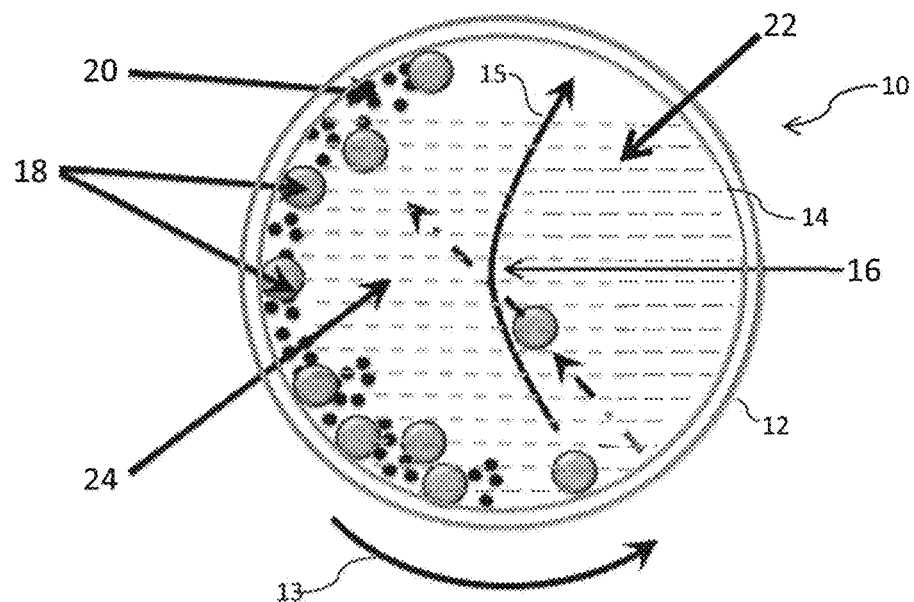
FIG. 1 illustrates a mechanochemical reaction taking place inside a ball milling container.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to methods for forming alane, and in one particular embodiment, for forming α-alane. The methods can provide benefits both in improved economics and in improved purity of the product. For instance, by use of disclosed methods, lesser purity precursors can be utilized as the process can purify the product upon formation. In addition, the system can be scaled up easily to any desired output rate.

The alane formation method utilizes at least one solid-phase reactant in a mechanochemical reaction synthesis to form a liquid-phase alane adduct with high yield and high purity. Moreover, the method can utilize adduct formation materials in the synthesis that can later be separated from the alane relatively easily. As such, a solid phase polymerized alane can be provided a lower costs and at high purity. The yield, reaction time, and production of undesirable side products can be controlled by optimizing the particular conditions of the mechanochemical reaction including, without limitation, the particular style of reactor, the temperature during the reaction, the weight ratio and size of mechanical components used (e.g., the balls in a ball mill), the speed of the reactor (e.g., RPM), and the hydrogen overpressure during reaction. Such variable can be tuned for each specific design to optimize the quality and yield of the alane formation.

The mechanochemical reaction is carried out by use of a system configured to drive the chemical reaction by repeated transference of mechanical energy from the reactor to the reactants, thereby inducing the desired chemical reaction by the direct absorption of the mechanical energy of the reactor. Mechanochemical reactors have been suggested as an environmentally friendly approach for use in organic synthesis as they can be used to drive a reaction that is not possible even with vigorous stirring. For instance, direct reaction between sodium alanate ($NaAlH_4$) and aluminum chloride ($AlCl_3$) in diethyl ether is not possible even with vigorous stirring due to the insolubility of $NaAlH_4$ in the solvent. However, $NaAlH_4$ is much less expensive than the lithium-based alanate. The presently disclosed methods provide a route for such low cost reactants.

Any mechanochemical reactor capable of generating suitable energy transfer to drive the alane formation reaction is encompassed herein. By way of example, and without limitation, a suitable mechanochemical reactor can encompass a ball mill, a shaker mill, a planetary mill, a jet mill, a twin screw extruder, a grinder, or any other device capable of transferring sufficient mechanical energy to the reactants so as to drive the chemical reaction and formation of alane.

FIG. 1 schematically illustrates a cross sectional view of a ball mill 10 as may be utilized in one embodiment. As shown, the ball mill 10 includes an outer shell 12 that in the illustrated embodiment can rotate in a counter-clockwise direction as indicated by the directional arrow 13. In this particular example, the ball mill is a planetary ball mill that also includes a supporting disc 14 with a direction of movement 15 opposite to that of the outer shell 12. During use, the counter-directional rotations can generate a centrifugal force 16 in the indicated direction. The ball mill 10 can be loaded with a predetermined number of milling balls 18 have a desired size, composition, and weight, as is known. For example, the milling balls 18 can be formed of chrome steel, stainless steel, rubber, ceramic, etc.

To form alane, the selected reactants are added to the reactor, e.g., the ball mill 10, in conjunction with a liquid phase Lewis base 24. The reactants include at least one alkali metal containing reactant 20 and at least one aluminum halide reactant 22. Significantly, the alkaline metal containing reactant 20 is insoluble in the liquid phase Lewis base 24. The Lewis base 24 is a liquid phase component that can form an adduct with alane at the reaction conditions.

The solid phase alkali metal containing reactant 20 can include, without limitation, an alkali metal based tetrahydroaluminate (also referred to as alanates) of the form $MAlH_4$ in which M is an alkali metal (e.g., Na, Li, K), an alkali metal hydride (e.g., NaH, LiH, KH), an alkali metal, or a combination thereof. In one embodiment the alkali metal containing reactant can include a sodium-based reactant, which can be much less expensive as compared to lithium based-materials as have been utilized in the past. In one embodiment, the alkali metal containing reactant can be free of lithium. The aluminum halide can include, without limitation, $AlCl_3$, $AlBr_3$, $AlI_3$, or combinations thereof The Lewis base can be a liquid phase at the conditions of the reaction and is capable of forming an adduct with the alane as it forms during the mechanochemical reaction. For instance, suitable Lewis bases can include ethers and amines such as, and without limitation, straight chain, branched, or cyclic alkyl ethers (e.g., diethyl ether, tetrahydrofuran, etc.), straight chain, branched or cyclic amines (e.g., ethyl amine, diethyl amine, tri-ethyl amines, tri-methyl amines, aniline, etc.), or combinations thereof. However, the Lewis base will be one that is in a liquid phase at the reaction conditions and within which the alkali metal containing reactant is insoluble at the reaction conditions.

In some embodiments, both the alkali metal containing reactant and the aluminum halide reactant can be insoluble in the Lewis base, but this is not a requirement of the method, and in other embodiments only the alkali metal containing reactant is insoluble in the Lewis base. As such, the method does not encompass the combination of a lithium alanate with liquid phase diethyl ether under conditions in which diethyl ether can function as a solvent for the lithium alanate. The process does allow, for example, synthesis of alane using $NaAlH_4$ and $AlCl_3$ in diethyl ether, as sodium alanate is not soluble in diethyl ether.

The Lewis base is also selected so as to form an adduct with alane upon formation. The methods thus allow the alane-forming chemical reaction to take place between species that are not soluble in the liquid contained in the reactor. However, as the alane product can complex with the liquid contained in the reactor to form an adduct, it can be protected from decomposition as well as phase-separated from one or both of the reactants immediately upon formation.

In some embodiments, the Lewis base can also be a relatively weak base. For instance, the conjugate acid of the Lewis base can have a $pK_a$ of about −2.5 or less. For example, the conjugate acid of the Lewis base can have a $pK_a$ of from about −2.5 to about −10, or from about −3 to about −7 in some embodiments. In this embodiment, a relatively weak base such as diethyl ether ($pK_a$ of $Et_2O^+=-3.5$) may be preferred to a stronger base such as tetrahydrofuran ($pK_a$ of $THF^+=-2.08$).

Use of a relatively weak base in formation of the alane adduct can facilitate downstream isolation and polymerization of the alane from the adduct. For instance, crystalline alpha alane can be obtained from diethyl ether alane adduct. If a more polar solvent such as tetrahydrofuran (THF) is used to form the alane adduct, the removal of the THF from the adduct can be very difficult because of the oxygen bond with alane in the THF adduct is much stronger than the adduct bond formed with alane in other adducts such as the diethyl ether alane adduct or amine-based adducts. When considering such strong adduct bonds, the isolation and polymerization of the alane can be difficult if achievable at all. For instance, heating $THF:AlH_3$ adducts in an attempt to form $\alpha$-$AlH_3$ crystals generally results in Al, hydrogen gas, and THF. By utilization of weaker bases, the process can include isolation and polymerization of the alane to produce high yield crystalline α-AlH$_3$ in a relatively straight forward and economical process.

Beneficially, the mechanochemical reaction can be carried out at atmospheric pressure without the addition of heat. In fact, it may be beneficial to incorporate periodic cooling periods in the process so as to prevent over-heating of the reactant mixture. The mechanochemical reaction results in the formation of the liquid phase alane adduct mixed with solid phase alkali metal reaction products (e.g., NaCl) and excess solid phase alkali metal containing reactant. As such the product adduct can be easily separated from the solids, including any solid impurities present in the initial reaction mixture, by filtering.

In one embodiment, the alane adduct formed by the mechanochemical reaction method can then be used to produce high yield crystalline α-alane. Any of the known methods of alane crystallization can be used to obtain the purified polymerized product, e.g., α-alane. For example, in one embodiment, 0.5 to 4.0 mole equivalents of a borohydride salt, such as lithium borohydride or sodium borohydride, can be mixed with the solution including the alane adduct. The mixture can then be filtered and the filtrate can be diluted with toluene or benzene to provide an ether to toluene or benzene ratio of about 15:85. The mixture can then be heated, e.g., to a temperature of from about 75° C. to about 85° C. to separate and crystallize the alane from the adduct. The adduct forming component, e.g., the diethyl ether, can then be subsequently removed from the product, e.g., by distillation, and the product alane can be precipitated and recovered.

Of course, any suitable alane recovery approach is encompassed herein, and the process is not limited to this method. By way of example, a method as described in French Patent No. FR2245569 (1975) can be used. According to this approach, to desolvate and crystallize the α-polymorph, the adduct forming component (e.g., diethyl ether) may be removed from the crystallization solution, such as by distilling. The distillation can be carried out between about 50° C. and about 85° C. At the bottom of this range, etherate intermediate is formed and is converted into α-alane. At the top of this range, etherate aluminum hydride does not appear and stable α-alane precipitates can formed almost immediately, Retention of about 8% to about 10% ether following the initial distillation can allow for the rearrangement of alane during the conversion to the α-form as thermal decomposition of the crystal is reduced and the final product is crystalline. In another embodiment, the crystallization solution may be heated at ambient or reduced pressure, as described in U.S. Pat. No. 7,238,336 to Lund et al., which is incorporated herein by reference. As yet another alternative, the solvent may be removed by vacuum drying at temperatures between about 30° C. and about 90° C. This process may be enhanced when a desolvating species is present such as a complex metal hydride (e.g., LiAl$_4$, LiBH$_4$) or a metal halide (e.g., LiCl). See, e.g., A. N. Tskhai et al. Rus. J. Inorg. Chem. 37:877 (1992), and U.S. Pat. No. 3,801,657 to Scruggs, which is incorporated herein by reference.

Disclosed methods can allow for the use of lower purity, low cost precursors and can be used to drive reactions that could not otherwise be possible. As an example, the reaction between relatively low cost AlCl$_3$ and NaAlH$_4$ can be carried out, which is based on less expensive reactants as compared to traditional lithium based approaches. The method utilizes powerful mechanical energy transfer to drive the reaction in a liquid phase component capable of stabilizing the product. The resultant adduct can be further processed to obtain crystalline α-alane.

The present disclosure may be better understood with reference to the example set forth below.

EXAMPLE

NaAlH$_4$ and AlCl$_3$, in a 6:1 molar ratio, were combined with diethyl ether and loaded into a planetary milling vial with 30 grams of 1 mm stainless steel ball bearings. The mixture/suspension was planetary milled at 500 RPM for 15 minutes in each direction with a 5 minute cooling period between. The resulting slurry was filtered and washed with diethyl ether under an inert atmosphere. The diethyl ether washings were collected and solvent removed under vacuum.

Figure 2:
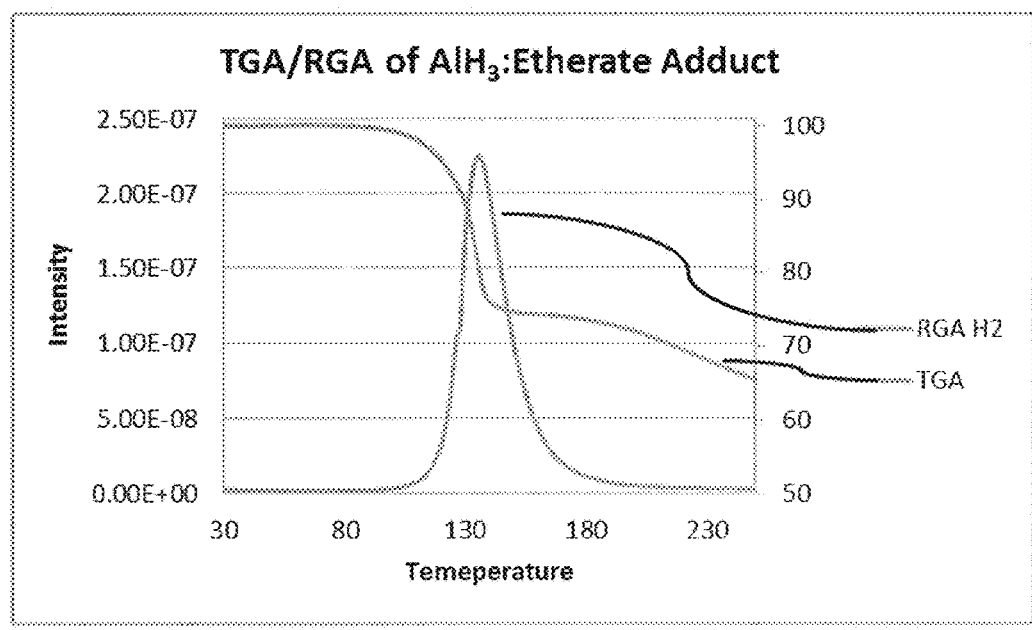
FIG. 2 presents the thermogravimetric analysis (TGA) and residual gas analysis (RGA) of an alane etherate adduct formed via ball milling as described following filtering and solvent removal.
Figure 3:
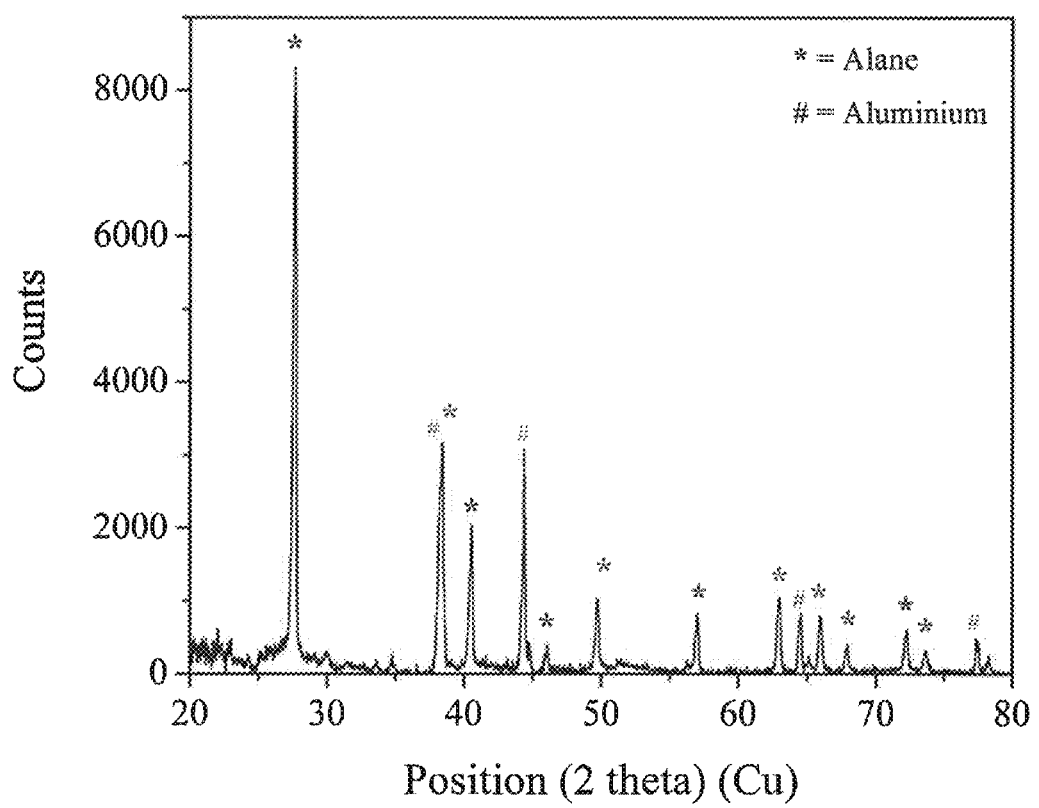
FIG. 3 presents the x-ray diffraction (XRD) of alane formed via ball milling as described.

TGA/RGA analysis (FIG. 2) of the resulting solid confirmed the material to be AlH$_3$.diethyl ether.

The AlH$_3$.diethyl ether adduct solid was mixed with LiBH$_4$ and LiAlH$_4$ by mortar and pestle and heated to 65° C. under vacuum for 2 hours. This solid was then washed with 100 mL of diethyl ether and dried to produce α phase AlH$_3$.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming alane comprising:
combining in a reactor a solid phase reactant comprising an alkali metal, an aluminum halide, and a liquid phase Lewis base, wherein the solid phase reactant comprising the alkali metal is not soluble in the Lewis base; and
repeatedly transferring mechanical energy to the reactants via the action of the reactor to encourage a mechanochemical reaction between the solid phase alkali metal containing reactant and the aluminum halide to form alane, the alane upon formation and within the reactor as the mechanochemical reaction proceeds forming a liquid phase adduct with the Lewis base.

2. The method of claim 1, wherein the reactor comprises a shaker mill, a planetary ball mill, a jet mill, a twin-screw extruder, a rotary ball mill, or a grinder.

3. The method of claim 1, wherein the reactor comprises a ball mill.

4. The method of claim 1, wherein the alkali metal containing reactant comprises an alkali metal based tetrahydroaluminate, an alkali metal hydride, an alkali metal, or a combination thereof.

5. The method of claim 1, wherein the alkali metal containing reactant comprises sodium.

6. The method of claim 1, wherein the alkali metal containing reactant is free of lithium.

7. The method of claim 1, wherein the aluminum halide comprises aluminum chloride, aluminum bromide, aluminum iodide, or a combination thereof.

8. The method of claim 1, wherein a conjugate acid of the Lewis base has a pKa of about −2.5 or less.

9. The method of claim 1, wherein the Lewis base comprises an ether or an amine.

10. The method of claim 1, wherein the Lewis base comprises diethyl ether.

11. The method of claim 1, wherein the Lewis base comprises, ethyl amine, diethyl amine, tri-ethyl amine, tri-methyl amine, aniline, or a combination thereof.

12. The method of claim 1, further comprising isolating and crystallizing the alane from the adduct.

13. The method of claim 12, wherein the isolated and crystallized alane comprises α-alane.

* * * * *